United States Patent [19]
Bantien et al.

[11] Patent Number: 5,446,437
[45] Date of Patent: Aug. 29, 1995

[54] TEMPERATURE SENSOR

[75] Inventors: Frank Bantien, Ditzingen; Eckart Reihlen, Reutlingen, both of Germany

[73] Assignee: Robert Bosch GmbH, Stuttgart, Germany

[21] Appl. No.: 998,516

[22] Filed: Dec. 30, 1992

[30] Foreign Application Priority Data

Jan. 31, 1992 [DE] Germany .............. 42 02 733.0

[51] Int. Cl.⁶ .................................. H01C 3/04
[52] U.S. Cl. ..................... 338/25; 338/307; 338/308; 437/60; 437/225; 437/918; 204/192.21
[58] Field of Search ............ 338/25, 307, 308; 437/225, 60, 918; 73/204.16, 204.25, 204.26, 708, 721; 374/178; 204/192.21; 357/26

[56] References Cited

U.S. PATENT DOCUMENTS

| | | | |
|---|---|---|---|
| 4,174,512 | 11/1979 | Blatter | 338/25 |
| 4,677,850 | 7/1987 | Miura et al. | 73/204 |
| 4,744,246 | 5/1988 | Busta | 73/204.26 |
| 4,870,745 | 10/1989 | Lee | 29/610.1 |
| 4,914,742 | 4/1990 | Higashi et al. | 357/26 |
| 4,934,190 | 6/1990 | Lee | 73/204.26 |
| 5,100,829 | 3/1992 | Fay et al. | 437/60 |

FOREIGN PATENT DOCUMENTS

| | | |
|---|---|---|
| 3041818A | 6/1982 | Germany. |
| 3138535A | 4/1983 | Germany. |
| 3431811A | 3/1986 | Germany. |
| WO89-05963 | 6/1989 | WIPO. |

OTHER PUBLICATIONS

B. Diem+, "SIMOX," Sensors & Actuators A21–A23 (1990) 1003–1006. Patent Abstracts of Japan, vol. 10, No. 300 [P-506], 14 Oct. 1986 summarizing Japanese publications 61-116 631(A) of 4 Jun. 1986, Takatsu/Nok Corp., Thin Film Thermistor & Manuf. Thereof.

Primary Examiner—Marvin M. Lateef
Attorney, Agent, or Firm—Frishauf, Holtz, Goodman & Woodward

[57] ABSTRACT

An improved temperature sensor is designed for the sensitive detection of temperature changes. The temperature sensor includes a frame 9 of monocrystalline silicon and a dielectric diaphragm 13 stretched on it. A monocrystalline silicon structure 35 is disposed on or under the dielectric diaphragm which is used for measuring the temperature. In the course of this, the Seebeck effect, as well as the temperature dependence of the electrical resistance, can be used for detection of any temperature changes.

21 Claims, 3 Drawing Sheets

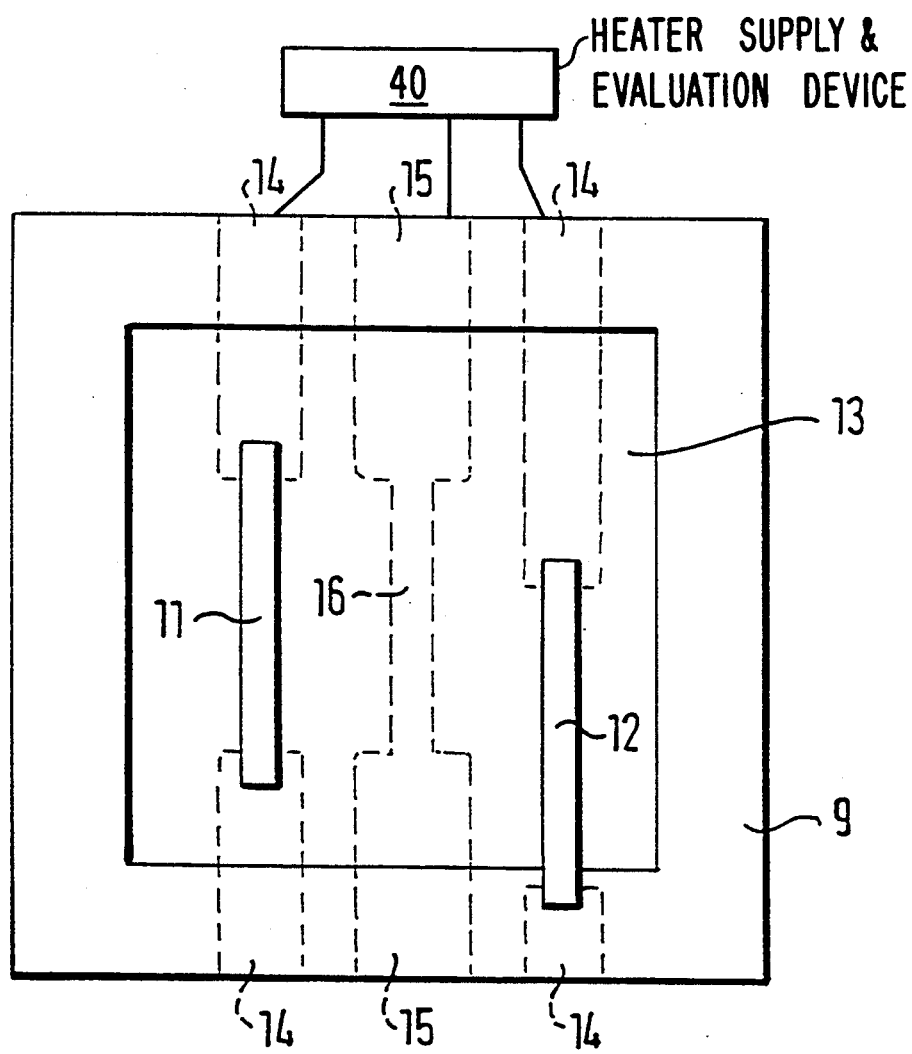

TEMPERATURE SENSOR

Cross-reference to related patents the disclosures of which are hereby incorporated by reference:

U.S. Pat. No. 5,142,781, Mettner et. al., issued Sep. 1, 1992, and corresponding PCT/EP90/01297, publ. as WO 91-02169;

U.S. Pat. No. 5,186,051, Stecher et al./Bosch, filed Feb. 27, 1991 and issued Feb. 16 1993;

U.S. Pat. No. 5,153,556, Hecht et al./Bosch, issued Oct. 6 1992;

U.S. Pat. Nos. 4,870,745 and 4,934,190, Lee/Siemens-Bendix, corresponding to WO 89-05963, published Jun. 29 1989.

FIELD OF THE INVENTION

The invention relates generally to a temperature sensor and, more particularly, to a sensor having a frame of monocrystalline silicon, supporting a dielectric membrane thereon.

BACKGROUND

A temperature sensor with a frame of monocrystalline silicon and a dielectric diaphragm supported by the frame is known from U.S. Pat. Nos. 4,870,745 and 4,934,190, Lee & Choi, and corresponding WO 89-05963 in which, however, a metal structure has been applied to the diaphragm for measuring the temperature. However, temperature sensors made from metal structures are relatively insensitive, which is undesirable.

THE INVENTION

Briefly, the sensor is constructed of a frame of monocrystalline silicon and a monocrystalline doped structure is formed on the dielectric diaphragm. The structure is supplied with electrical terminals or terminal connections. This structure can be used in two modes. When used as a temperature-dependent resistor, the silicon structure supported on the dielectric diaphragm is doped with deep doping materials having an energy level which is at least approximately at the center of the energy gap of silicon. When used as a voltage source, that is, employing the Seebeck effect, the doping materials can be as customarily used in semiconductor technology. In accordance with a feature of the invention, the sensor is made by inserting a silicon structure of the opposite conductivity type to the basic wafer which also forms the frame, and a thin dielectric layer is formed on the surface of the wafer. Openings are cut into the dielectric layer to provide connection terminals and a cut-out is etched into the silicon wafer which extends as far as the dielectric layer, or as far as the silicon structure, to form the sensor.

In contrast to the above, the arrangement in accordance with the invention has the advantage that a structure of monocrystalline silicon is used for temperature measurement. Because monocrystalline silicon potentially has a very large Seebeck effect or high sensitivity of conductivity with respect to temperature, very sensitive temperature sensors can be produced by means of monocrystalline silicon.

Good thermal separation of the monocrystalline silicon structure from the frame is achieved by disposing silicon nitride, silicon oxide or silicon oxinitride on a dielectric diaphragm. The top surface is covered with a protective dielectric layer as a protection against dirt and damage.

A particularly smooth surface of the diaphragm is achieved by disposing the monocrystalline silicon structure on the underside of the frame. In this case, the monocrystalline silicon structure is particularly simply connected through openings in the diaphragm. Different manufacturing processes must be used when the monocrystalline silicon structure is to be located on top of the diaphragm. Because of this it is not necessary to cut openings for connecting the silicon structure. The temperature sensitivity of the electrical resistance of monocrystalline silicon can be greatly increased by the use of deep doping materials. It is possible, in comparison with flat doping materials, to attain a sensitivity increase by a factor of 1000. Gold, for example, is suitable for deep doping.

The temperature sensor is designed so that it makes use of the Seebeck effect by the partial disposition of the mono-crystalline silicon structure in the area of the frame. appropriate feed lines have contact points located partially in the area of the frame and partially in the area of the diaphragm. The Seebeck effect has the advantage that no external voltage needs to be provided for measuring the temperature. The Seebeck effect is the basis of all thermocouples. The temperature sensor can be used as a mass flow sensor by providing a heater which maintains the diaphragm at a higher temperature than the frame. Through measurement of the temperature of the diaphragm it is possible to measure the heat loss of a medium flowing along the top of the diaphragm and thus the amount of the medium flowing by.

A particularly simple manufacture of the temperature sensors is possible by means of the process of the invention. This process can be used in particular for parallel mass production of the temperature sensors of the invention. A particularly exact and reproducible etch stop is achieved by the application of a voltage to the silicon structure. Production of dielectrical layers by chemical reaction of the wafer surface with a gas is particularly simple, separation of the dielectric layers by sputtering or separation from the gas phase makes possible increased freedom in the choice of the materials or decreased temperature stresses of the wafer. Another production method for the temperature sensors of the invention makes use of implantation of oxygen in a silicon wafer. The possibilities for the manufacture of temperature sensors are increased by this process.

DRAWINGS

FIG. 3 shows a top view of the temperature sensors incorporated in an air flow sensor.

DETAILED DESCRIPTION

Figure 1A:
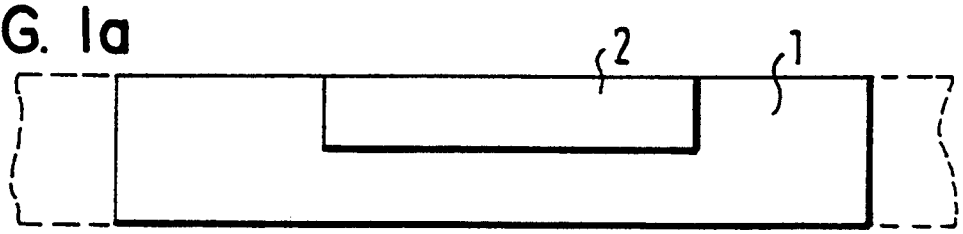
FIGS. 1a to 1c show the production of the temperature sensors of the invention.

A silicon wafer is indicated by 1 in FIG. 1a, into which a silicon structure 2 has been placed. Structure 2 differs from the silicon wafer 1 by its doping. Subsequently only a portion of the silicon wafer 1 is shown, namely the part corresponding to the future temperature sensor. Cutting of the silicon wafer 1 is performed by sawing, for example. Doping of the silicon structure 2 is performed for example by implantation or diffusion.

The type of doping material in this case depends on the measurement effect used.

Figure 1B:
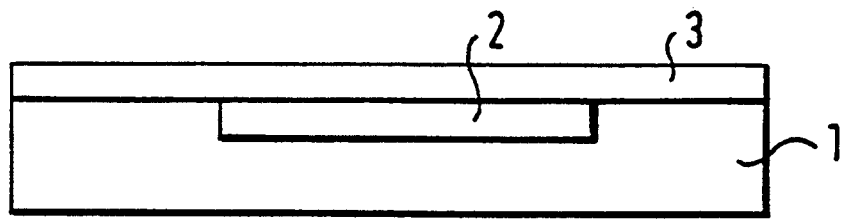
Figure 1C:
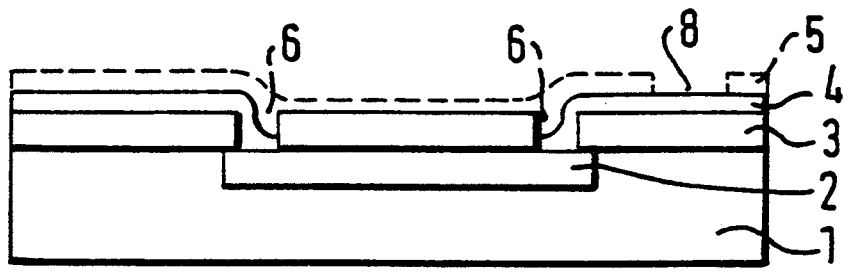
Figure 1D:
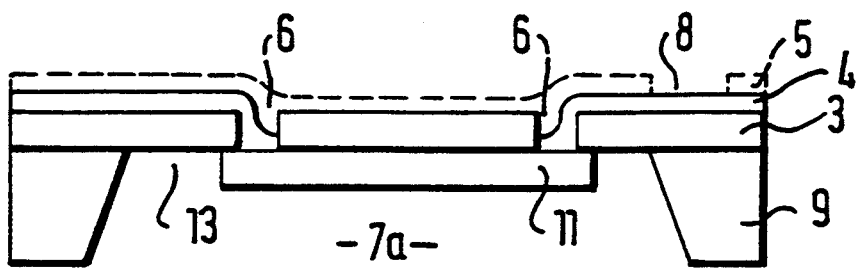
FIGS. 1d and 1e show two exemplary embodiments of the temperature sensor of the invention made by the same process, but using different doping materials.
Figure 1E:
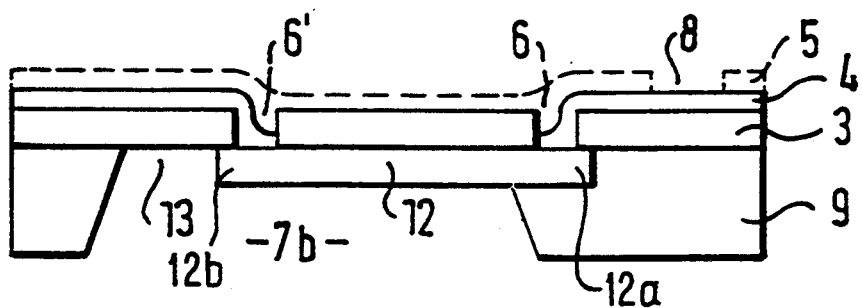

In accordance with a feature of the invention, and when it is intended to use the Seebeck effect for measuring the temperature, FIG. 1e, for example, the doping materials normally used in semiconductor technology can be used, such as phosphorus, boron or arsenic. The sensitivity of the sensor element increases with increasing concentration of these doping materials. With monocrystalline silicon, it is possible to achieve sensitivities which are greater by a factor of 5 in comparison to polysilicon aluminum.

In accordance with a feature of the invention, and when the silicon structure 2 is to be used as a temperature dependent resistor, FIG. 1d, for example, deep doping materials are used. These are characterized in that their energy level is located approximately at the center of the energy gap of silicon. Thus, gold, tin, cobalt or vanadium, for example, are suitable as deep doping materials. The conductivity of silicon monocrystals doped in this manner is determined by the proportion of ionized doping atoms. The degree of ionization exponentially depends on the temperature; therefore, the temperature dependency of the electrical resistance is high.

A dielectric layer 3 is produced on the silicon wafer 1. This dielectric layer was produced, as seen in FIG. 1b, by a chemical reaction of the material of the silicon wafer 1 with a gas, for example with oxygen. In the course of this, a portion of the dielectric diaphragm is formed out of the silicon structure 2. As a rule, however, the doping material concentrations are so weak that the dielectric diaphragm 3 is not electrically conductive. Thermal oxidation, i.e. the chemical reaction of the wafer surface with oxygen has the advantage of being particularly simple. But other techniques can also be employed which permit the deposition of a dielectric layer 3 on the surface of the silicon wafer 1.

It is possible to deposit almost any materials on the wafer surface by sputtering. Another method for depositing dielectric layers on the surface of the wafer 1 consists in deposition from the gaseous phase, the so-called chemical vapor deposition methods. It is possible to deposit silicon oxide, silicon nitride or silicon oxynitride, for example, on the wafer surface by these methods. If the dielectric layer is not produced by reaction of the wafer surface with a gas, it is also possible to generate leads to the silicon structure prior to depositing the dielectric layer 3. In this case it is advantageous that the number of required process steDs can be reduced, but has the disadvantage that the diaphragm may be weakened in the area of the leads.

In FIG. 1c, the dielectric layer 3 is provided with contact holes 6. This is accomplished by means of the conventional processes of photo-lithography and etching techniques. It is possible to apply a further protective layer 5 on the surface as a protection for the sensor element. However, for connecting the silicon structure, the protective layer must have a contact opening 8 on at least one place of the wafer 1.

FIG. 1d illustrates a completed temperature sensor utilizing the temperature dependency of the electrical resistance. To produce this sensor, a cut-out 7 is provided in the back of the silicon wafer 1 shown in FIG. 1, view C. The temperature sensor has a dielectric diaphragm 13 of low temperature conductivity formed in part by layer 3, a monocrystalline silicon structure 11 and a frame 9 of monocrystalline silicon. The monocrystalline silicon structure 11 formed of structure 2 is so located on the diaphragm 13 that it is not in contact with the frame 9 at any place. Because the dielectric materials of the diaphragm 13 have lesser thermal conductivity, the monocrystalline silicon structure 11 is thermally insulated from the frame 9.

An etching solution which etches silicon with high anisotropy, such as KOH (potassium hydroxide), was used for making the cut-out 7. The dielectric material of the diaphragm 13, such as silicon oxide or silicon nitride, are only negligibly etched by such etching solutions. The monocrystalline silicon structure 11 can be protected from the action of the etching solution by means of its doping—possible with the aid of applying a voltage. If it is intended to protect the monocrystalline silicon structure 11 from the effect of the etching solution by means of an applied voltage, the monocrystalline silicon structure 11 and the frame 9 must be of different conducting types. It is conceivable, for example, that the frame 9 is made of p-silicon and the monocrystalline silicon structure 11 of n-silicon.

The resistance of the monocrystalline silicon structure 11 is measured via the connections 4. Because this resistance is largely dependent on the temperature, it is possible to obtain information regarding the temperature on the dielectric diaphragm 13.

FIG. 1e illustrates a design of the temperature sensor extends as far as the dielectric diaphragm 13 and the monocrystalline silicon structure 12. One end 12a of the monocrystalline silicon structure 12 is embedded in the frame 9 of monocrystalline silicon. One of the contact holes 6 (contact 1) is also located in this area. The other end 12b of the monocrystalline silicon structure 12 is located on the dielectric diaphragm 13. A further contact hole 6 (contact 2) is located in that area.

When a temperature difference occurs between the contacts 1 and 2 in contact holes 6,6', an electrical voltage difference is generated between the two terminal connections 4. This is Seebeck voltage, which can be detected by measurements. The cut-out 7b again extends as far as the dielectric diaphragm 13 and as far as the monocrystalline silicon structure 12. Again, protection of the monocrystalline silicon structure 12 can be achieved by appropriate doping or application of a voltage. Protection by means of an applied voltage is provided analogously to that in FIG. 1d. The basic difference in structures 11 and 12 thus is the doping of structure 2, FIGS. 1a, 1b, 1c, and the location of the structure 11 or 12 with respect to the frame 9.

Figure 2A:
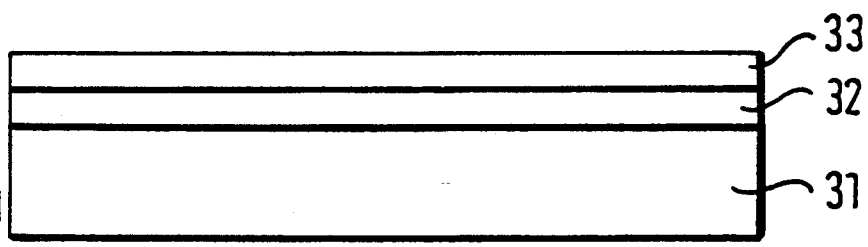
FIGS. 2a to 2c show another production process.
Figure 2B:
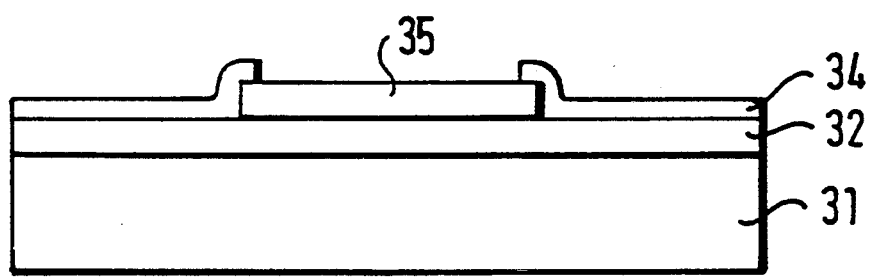

A different manufacturing process for the temperature sensors in accordance with the invention is shown in FIG. 2. A silicon oxide layer was generated in a silicon wafer 31 underneath a monocrystalline silicon layer 33 of FIG. 2, View A. Oxygen ions were implanted in the silicon wafer 31 to produce this buried silicon oxide layer 32.

A corresponding process is described by Diem et al. in the journal "Sensors and Actuators", A 21 to A 23 (1990), 1003 to 1006, under the title "SIMOX: A Technology for High Temperature Silicon Sensors". The monocrystalline silicon structure 35 has been created in FIG. 2b by structuring the monocrystalline silicon monocrystalline silicon layer 33 is performed by means of photo-lithography and etching processes. Sputtering-on metal layers, for example, is suitable for creating the terminals 34.

Figure 2C:
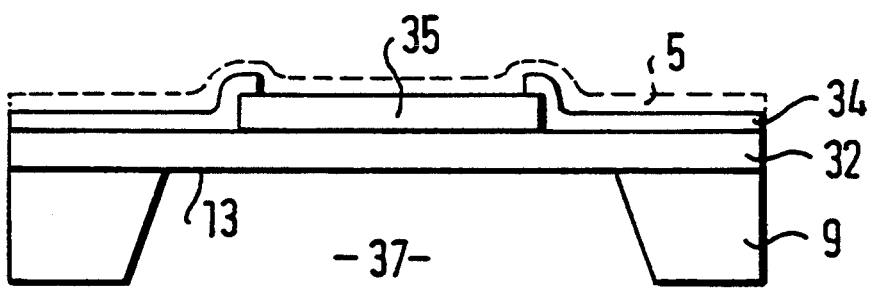

In FIG. 2c, the temperature sensor has been formed with a frame 9 of monocrystalline silicon and a dielectric diaphragm 13 by making a cut-out 37. A protective layer 6 of silicon oxide or silicon nitride has been deposited on the top surface of the temperature sensor. Etching of the cut-out 37 is particularly simple with this process, because the dielectric diaphragm 13 can be employed as an etch stop. The sensor shown here also employs the temperature dependency of the electrical resistance in the mono-crystalline structure 35. If one end of the monocrystalline silicon structure 35 is located in the area of the frame 9, the Seebeck effect can be used in an equivalent manner for temperature measurement for this sensor.

The temperature sensors of the invention are shown in FIG. 3 in their use in an air mass sensor. The air mass sensor has a frame 9 of monocrystalline silicon in which a dielectric diaphragm 13 has been stretched. The monocrystalline silicon structures 11 and 12 are located on the dielectric diaphragm, the monocrystalline silicon structure 12 being partially located in the area of the frame 9. In the illustration, in a top view shown here, it is of no consequence whether the monocrystalline structures 11, 12 are located on the top or the underside of the diaphragm 13. Thus, the illustration shown here applies equally to the sensors shown in FIG. 1 and FIG. 2. The monocrystalline silicon structures 11, 12 are connected by leads 14. Connection with an electronic evaluation device 4 can be made through the connections 14. The former can be located either outside of the sensor or can be monolithically integrated in the silicon frame. Furthermore, a heater 16 with feed lines 15 is disposed on the diaphragm 13.

In the example shown here, the heater 16 is particularly simply formed by a decrease in the cross section of the feed lines 15. However, any other heaters based on the transformation of electric current into heat are also conceivable.

The diaphragm 13 is maintained at a higher temperature than the frame 9 by the heater 16. Because the dielectric membrane 13 has only a low thermal conductivity, little heat is given off by the heater 16 to the frame 9 via the diaphragm 13. Thus the diaphragm 13 will be at a higher temperature, which can be detected by the temperature sensors. If the diaphragm 13 is placed into a flow of a medium, for example an air flow, it transfers heat to the flowing medium and therefore is cooled. The heat loss in this case depends on the mass flow of the flowing medium. By measurement of the temperature, it is thus possible to make conclusions with respect to the amount of medium flowing by, per unit of time. The more sensitive the temperature measurement, the more sensitive, accurate and interference-free is the sensor. The sensitivity, freedom from interference and accuracy of the flow-through sensor are therefore increased by using monocrystalline silicon structures 11, 12. For simplicity, the heater supply and the evaluation circuit are shown in a single block representation.

Various changes and modifications may be made, and features described in connection with any one of the embodiments may be used with any of the others, within the scope of the inventive concept.

We claim:
1. A temperature sensor having
a frame (9) of monocrystalline silicon;
a dielectric diaphragm (13) supported by the frame (9);
a monocrystalline silicon structure (2, 11, 35) formed on the dielectric diaphragm (13);
electrical terminal connections (4, 14) connected to the monocrystalline silicon structure (2, 11, 35) to obtain electrical measuring outputs representative of the temperature of the dielectric diaphragm (13); and
wherein the monocrystalline structure comprises a temperature-dependent resistor wherein the monocrystalline structure (2, 11, 35) is doped with a deep doping material.

2. The sensor of claim 1, wherein the deep doping material comprises a material having an energy level which is at least approximately at the center of the energy gap of silicon.

3. The sensor of claim 1, wherein the deep doping material comprises gold, tin, cobalt or vanadium.

4. The sensor of claim 1, wherein the monocrystalline silicon structure (11) is applied to the underside of the dielectric diaphragm (13).

5. The sensor of claim 1, wherein the dielectric diaphragm (13) is formed with connection terminal openings (6), and said electrical terminal connections (4, 14) are connected to the monocrystalline silicon structure (2, 11, 35) through said openings.

6. The sensor of claim 1, wherein the monocrystalline structure (2, 11, 35) is solely supported by the diaphragm (13) and is devoid of overlap with the frame (9).

7. A temperature sensor having
a frame (9) of monocrystalline silicon;
a dielectric diaphragm (13) supported by the frame (9);
a monocrystalline silicon structure (2, 12, 35) formed on the dielectric diaphragm (13);
electrical terminal connections (4, 14) connected to the monocrystalline silicon structure (2, 12, 35) to obtain electrical measuring outputs representative of the temperature of the dielectric diaphragm (13); and
wherein the monocrystalline structure comprises a Seebeck effect semiconductor wherein the monocrystalline structure (12) is partially located in the area of, and overlaps, the frame (9),
the electrical terminal connections are not made of silicon; and
one of two connecting points of the terminal connections (4, 14), with the silicon structure (2, 12), is located in the area of the frame (9) and the other is located in the area of the diaphragm (13).

8. The sensor of claim 7, wherein said monocrystalline silicon structure (2, 12, 35) is doped with a doping material comprising at least one of: phosphorus, boron, or arsenic, and wherein, optionally, said doping materials are present at an elevated concentration.

9. The sensor of claim 7, wherein the monocrystalline silicon structure (12) is applied to the underside of the dielectric diaphragm (13).

10. The sensor of claim 7, wherein the dielectric diaphragm (13) is formed with connection terminal openings (6), and said electrical terminal connections (4, 14) are connected to the monocrystalline silicon structure (2, 12, 35) through said openings.

11. A temperature sensor for use in an air mass flow rate sensor,
comprising the sensor of claim 21,
and further including a heater (16) located adjacent the diaphragm (13) in the vicinity of the monocrystalline silicon structure (11, 35) to maintain the dielectric diaphragm at a higher temperature than the frame (9); and wherein the electrical terminal connections (14) are connectable to an electronic evaluation device (40) to evaluate the heat loss of a medium flowing across the surface of the diaphragm, said sensor measuring the temperature of the dielectric diaphragm (13).

12. A temperature sensor for use in an air mass flow rate sensor, comprising the sensor of claim 7, and further including a heater (16) located adjacent the diaphragm (13) in the vicinity of the monocrystalline silicon structure (12, 35) to maintain the dielectric diaphragm at a higher temperature than the frame (9); and wherein the electrical terminal connections (14) are connectable to an electronic evaluation device (40) to evaluate the heat loss of a medium flowing across the surface of the diaphragm, said sensor measuring the temperature of the dielectric diaphragm (13).

13. A method to make a temperature sensor having a frame (9) of monocrystalline silicon;

a dielectric diaphragm (13) supported by the frame (9);

a monocrystalline silicon structure (2, 11, 12) formed on the dielectric diaphragm (13);

electrical terminal connections (4, 14) connected to the monocrystalline silicon structure (2, 11, 12) to obtain electrical measuring outputs representative of the temperature of the dielectric diaphragm (13);

comprising the steps of providing a monocrystalline silicon wafer (31);

inserting oxygen ions in the wafer (31) to form a buried silicon oxide layer (32) therein, to form a monocrystalline portion (31) of the wafer, and leave a monocrystalline layer (33) above the silicon oxide layer (32);

shaping or structuring the monocrystalline layer (33) to form a monocrystalline structure (35) above the silicon oxide layer (32);

doping said monocrystalline structure (35);

providing the monocrystalline structure (35) with terminals (34); and etching a cut-out (37) of the silicon wafer (31) up to the silicon oxide layer (32) while leaving a frame (9) of crystalline wafer material (31), whereby the silicon oxide layer (33) will form the diaphragm (13).

14. The method of claim 13, wherein the etching step comprises applying an etching solution; and further including the step of protecting the silicon structure (2, 35) from the effect of the etching solution by applying a voltage or by a high concentration of doping materials.

15. The method of claim 13, wherein the step of forming the dielectric layer comprises forming a chemical reaction of the wafer surface with a gas.

16. The method of claim 13, wherein the dielectric layer is created by deposition from a gaseous phase.

17. The method of claim 13, wherein the step of forming the dielectric layer comprises sputtering.

18. The method of claim 13, wherein said doping step comprises deep-doping said monocrystalline structure (2, 35) with a doping material having an energy level which is at least approximately at the center of the energy gap of silicon.

19. The method of claim 13, wherein the step of inserting oxygen ions comprises implanting oxygen ions in the wafer (31) by ion implantation.

20. The method of claim 13, wherein the etching step comprises etching the cut-out (37) from the back of the silicon wafer (31) up to the silicon layer (32) while leaving the frame (9).

21. The method of claim 19, wherein the etching step comprises etching the cut-out (37) from the back of the silicon wafer (31) up to the silicon layer (32) while leaving the frame (9).

* * * * *